United States Patent
Engerman (10) Patent No.: US 11,149,823 B2
(45) Date of Patent: Oct. 19, 2021

(54) PLANETARY GEAR SYSTEM WITH DISCONNECT AND THE DRIVE AXLE MADE THEREWITH

(71) Applicant: Dana Automotive Systems Group, LLC, Maumee, OH (US)

(72) Inventor: Eric M. Engerman, Novi, MI (US)

(73) Assignee: Dana Automotive Systems Group, LLC, Maumee, OH (US)

(*) Notice: Subject to any disclaimer, the term of this patent is extended or adjusted under 35 U.S.C. 154(b) by 96 days.

(21) Appl. No.: 16/528,086

(22) Filed: Jul. 31, 2019

(65) Prior Publication Data

US 2020/0040967 A1    Feb. 6, 2020

Related U.S. Application Data (60) Provisional application No. 62/712,661, filed on Jul. 31, 2018.

(51) Int. Cl.
| | |
|---|---|
| *F16H 3/44* | (2006.01) |
| *F16H 48/12* | (2012.01) |
| *F16D 11/14* | (2006.01) |
| *F16D 11/00* | (2006.01) |
| *B60K 17/06* | (2006.01) |
| *B60K 17/356* | (2006.01) |

(Continued)

(52) U.S. Cl.
CPC .............. *F16H 3/44* (2013.01); *F16H 48/12* (2013.01); *B60K 1/00* (2013.01); *B60K 6/365* (2013.01); *B60K 6/52* (2013.01); *B60K 17/06* (2013.01); *B60K 17/356* (2013.01); *B60Y 2200/91* (2013.01); *B60Y 2200/92* (2013.01); *B60Y 2400/73* (2013.01); *F16D 11/14* (2013.01); *F16D 2011/008* (2013.01); *F16H 2200/0021* (2013.01); *F16H 2200/2097* (2013.01)

(58) Field of Classification Search
CPC ............................. F16D 11/14; B60K 17/356
See application file for complete search history.

(56) References Cited

U.S. PATENT DOCUMENTS

| | | | |
|---|---|---|---|
| 6,604,591 B2* | 8/2003 | Bowen ................... | B60K 6/547 180/65.6 |
| 7,244,210 B2 | 7/2007 | Hamai | |

(Continued)

FOREIGN PATENT DOCUMENTS

| | | |
|---|---|---|
| DE | 102016120965 | 5/2017 |
| DE | 102017130778 | 6/2018 |

(Continued)

OTHER PUBLICATIONS

European Patent Office, International Search Report and Written Opinion issued in International Application No. PCT/US2019/044436, dated Oct. 10, 2019, 15 pages, Rijswijk Netherlands.

*Primary Examiner* — Derek D Knight
(74) *Attorney, Agent, or Firm* — McCoy Russell LLP (57) ABSTRACT

An electric drive axle including a first gear and an idler shaft having a second gear and a third gear disposed thereon, wherein the second gear cooperates with the first gear. A clutch assembly selectively couples a planetary gear system to one of the second gear and the third gear, wherein the planetary gear system is configured to produce a predetermined gear ratio between the second gear and the third gear.

16 Claims, 10 Drawing Sheets

(51) Int. Cl.
  *B60K 6/52* (2007.10)
  *B60K 6/365* (2007.10)
  *B60K 1/00* (2006.01)

(56) References Cited

U.S. PATENT DOCUMENTS

| | | |
|---|---|---|
| 7,832,514 B2 | 11/2010 | Janson |
| 8,727,928 B2 | 5/2014 | Harashima |
| 9,033,839 B2 | 5/2015 | Rossey |
| 9,366,321 B2 | 6/2016 | Zhang |
| 9,453,564 B1 | 9/2016 | Pritchard |
| 9,707,956 B2 | 7/2017 | Swales |
| 9,987,918 B2 | 6/2018 | Haupt |
| 10,036,458 B2 | 7/2018 | Littlefield |
| 10,094,461 B2 | 10/2018 | Gassmann |
| 10,259,308 B2 | 4/2019 | Goleski |
| 2017/0261082 A1* | 9/2017 | Pritchard ............... B60K 17/08 |
| 2019/0078674 A1 | 3/2019 | Dzafic |

FOREIGN PATENT DOCUMENTS

| | | |
|---|---|---|
| WO | 2007147800 | 12/2007 |
| WO | 2018045027 | 3/2018 |
| WO | 2019014479 | 1/2019 |

\* cited by examiner

PLANETARY GEAR SYSTEM WITH DISCONNECT AND THE DRIVE AXLE MADE THEREWITH

CROSS-REFERENCE TO RELATED APPLICATION

The present application claims the benefit of U.S. Provisional Patent Application Ser. No. 62/712,661, filed on Jul. 31, 2018, which is fully incorporated by reference herein.

FIELD

The present disclosure relates to electric drive axles, and more particularly to a planetary gear system with a disconnect device for an electric drive axle.

BACKGROUND

Electric and hybrid-electric vehicles utilize an electric power source in communication with an electric motor to provide drive, or augmented drive, to the vehicle. Electric vehicles have several characteristics superior to conventional internal combustion engine driven vehicles. For example, electric motors produce fewer vibrations than internal combustion engines, and electric motors achieve maximum torque more quickly than internal combustion engines.

A disconnect device for decoupling the electric motor from the vehicle wheels such that the vehicle speed is not limited by the electric motor may be desirable in some applications. In view of the above, there remains a need for an electric drive axle disconnect device that does not require complicated and expensive components.

It would be desirable to produce an electric drive axle having a disconnect device that remains compact in size and weight.

SUMMARY

In concordance and agreement with the present disclosure, an electric drive axle having a disconnect device that remains compact in size and weight, has surprisingly been discovered.

In one embodiment, an electric drive axle, comprises: a first gear; a rotatable shaft having a second gear and a third gear disposed thereabout, wherein the second gear cooperates with the first gear; and a planetary gear system disposed about the rotatable shaft, wherein the planetary gear system is configured to produce a predetermined gear ratio between the second gear and the third gear.

As aspects of certain embodiments, the planetary gear system includes at least one sun gear, a plurality of planet gears disposed in a carrier, and at least one annulus.

As aspects of certain embodiments, at least one of the second gear, the at least one sun gear, the carrier, the at least one annulus, and the third gear is coupled to the rotatable shaft for rotation therewith.

As aspects of certain embodiments, at least one of the second gear, the at least one sun gear, the carrier, the at least one annulus, and the third gear freely rotates about the rotatable shaft.

As aspects of certain embodiments, at least one of the at least one sun gear, the carrier, and the at least one annulus is stationary.

As aspects of certain embodiments, the electric drive axle further comprises a clutch assembly disposed about the rotatable shaft.

As aspects of certain embodiments, the clutch assembly is disposed between the planetary gear system and one of the second gear and the third gear.

As aspects of certain embodiments, at least one of the second gear, the at least one sun gear, the carrier, the at least one annulus, and the third gear is selectively coupled to the rotatable shaft by the clutch assembly.

As aspects of certain embodiments, the clutch assembly includes an annular hub formed on one of the at least one sun gear, the carrier, and the at least one annulus of the planetary gear system.

As aspects of certain embodiments, the clutch assembly further includes an annular hub formed on the second gear and a sleeve configured to selectively engage at least one of the annular hub of the planetary gear system and the annular hub of the second gear.

As aspects of certain embodiments, the clutch assembly further includes an annular hub formed on the third gear and a sleeve configured to selectively engage at least one of the annular hub of the planetary gear system and the annular hub of the third gear.

As aspects of certain embodiments, the electric drive axle further comprises a differential mechanism configured to transfer a desired toque to at least one axle shaft.

As aspects of certain embodiments, the electric drive axle further comprises a fourth gear coupled for rotation with the differential mechanism, wherein the fourth gear cooperates with the third gear.

In another embodiment, a method of generating torque for a vehicle, comprises: providing an electric drive axle including: a first gear; a rotatable shaft having a second gear and a third gear disposed thereabout, wherein the second gear cooperates with the first gear; and a planetary gear system disposed about the rotatable shaft; and producing a desired torque by selectively coupling the planetary gear system to one of the first gear and the third gear.

As aspects of certain embodiments, the planetary gear system produces a predetermined gear ratio between the second gear and the third gear.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 1:
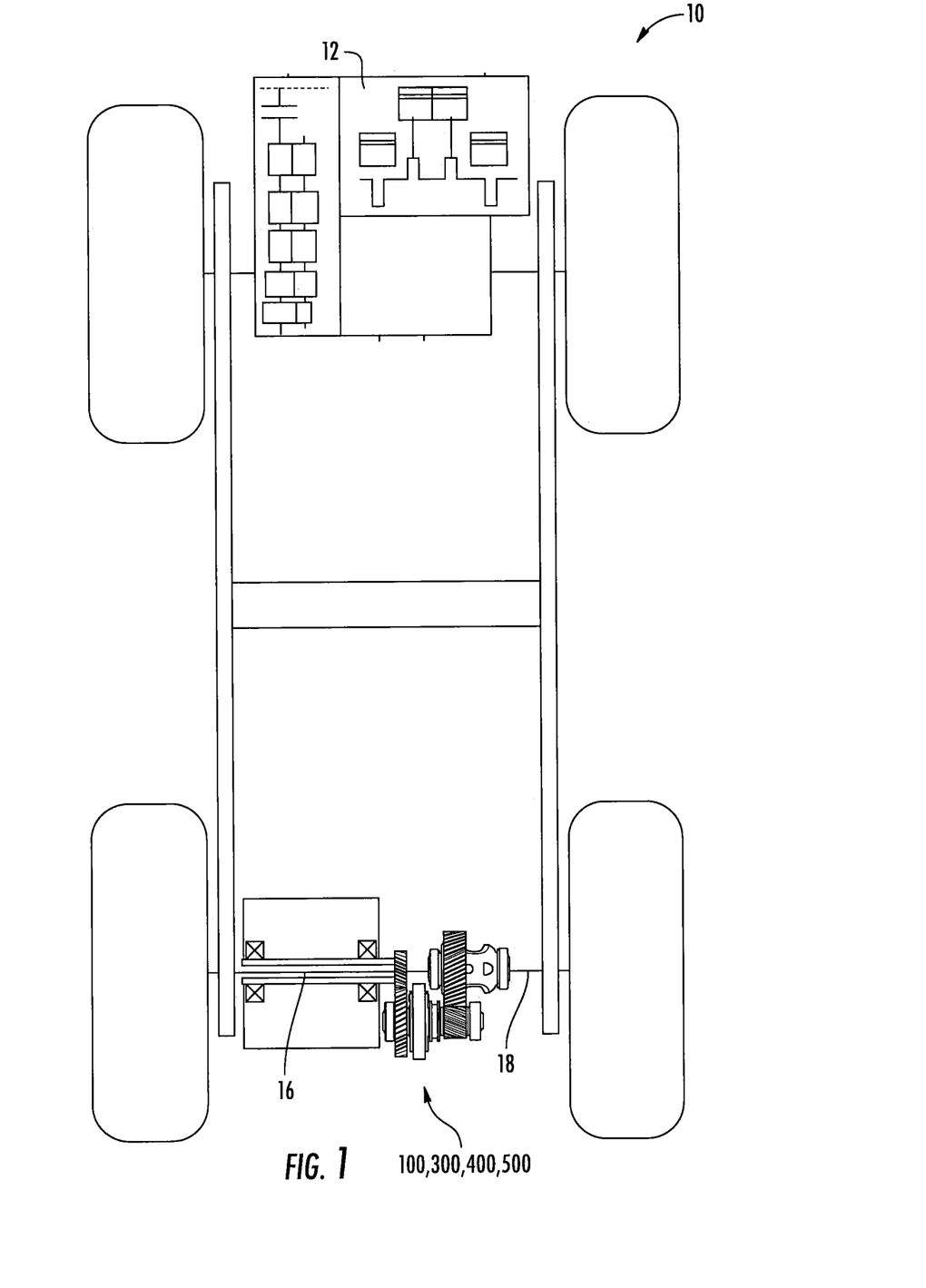
FIG. 1 is a schematic diagram of a vehicle driveline according to an embodiment of the presently disclosed subject matter.

Embodiments of an electric drive axles 100, 300, 400, 500 are described below. The electric drive axles 100, 300, 400, 500 may be utilized with a pure electric vehicle (not depicted) where the electric drive axles 100, 300, 400, 500 are the only driving axle. In other embodiments, as illustrated in FIG. 1, the electric drive axles 100, 300, 400, 500 may be utilized with a hybrid four-wheel-drive vehicle 10 where the front axle is driven by an internal combustion engine 12, and the rear axle is one of the electric drive axles 100, 300, 400, 500 (or vice versa). In still other embodiments, the electric drive axles 100, 300, 400, 500 may be utilized in a hybrid commercial vehicle (not depicted) comprising a tandem axle in which the front tandem axle is driven by an internal combustion engine, and the rear tandem axle is one of the electric drive axles 100, 300, 400, 500 (or vice versa). The electric drive axles 100, 300, 400, 500 may have applications in commercial vehicles, both light duty and heavy duty vehicles, and for passenger, off-highway, and sport utility vehicles. Additionally, the electric drive axles 100, 300, 400, 500 described herein may be adapted for use in front and/or rear driving axles, and in steerable and non-steerable axles. It would be understood by one of ordinary skill in the art that the electric drive axles 100, 300, 400, 500 also have industrial, locomotive, military, agricultural, and aerospace applications.

Figure 2:
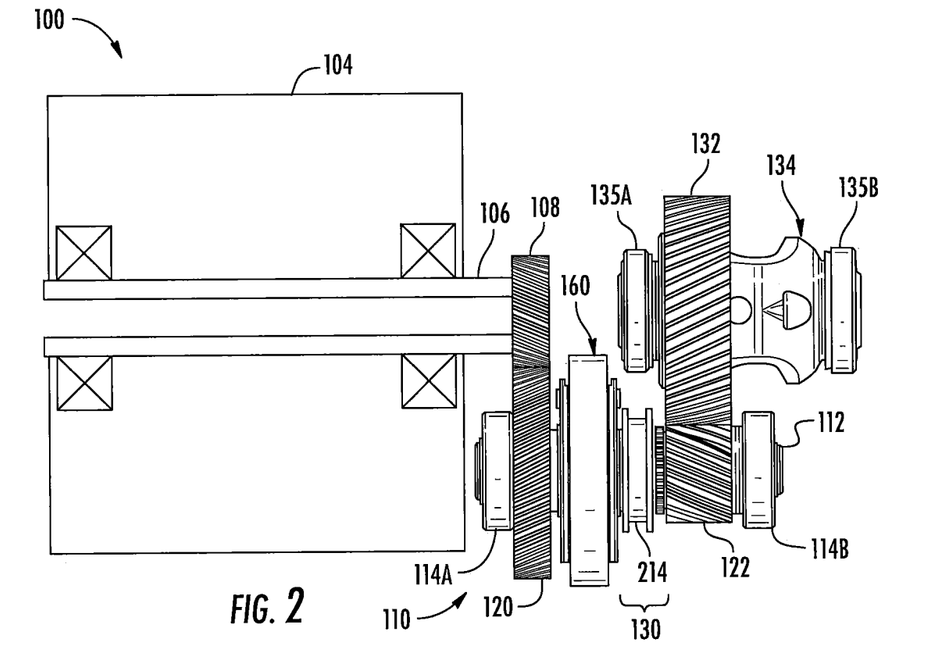
FIG. 2 illustrates a portion of an electric drive axle of the driveline shown in FIG. 1 including an electric motor, a compound idler assembly, and a differential case.
Figure 3:
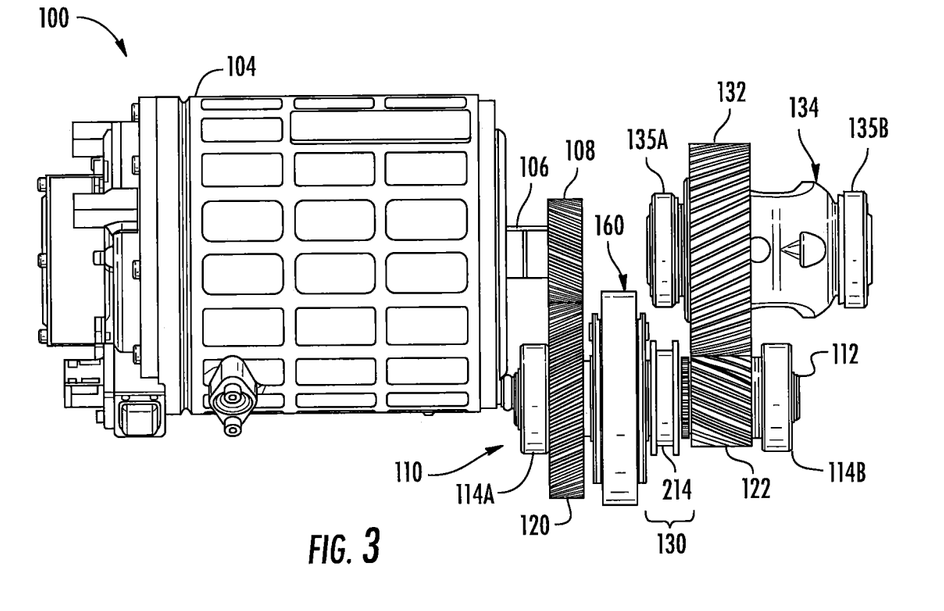
FIG. 3 is a side elevational view of the portion of the electric drive axle shown in FIG. 2 including the electric motor, the compound idler assembly, and the differential case.

In certain embodiments illustrated in FIGS. 2-3, the electric drive axle 100 may comprise an integrated drive system. In an embodiment, the electric drive axle 100 includes an electric motor 104 (e.g., electromotor) coupled with a power source (not depicted). The electric motor 104 may be a permanent magnet synchronous machine comprising a stator disposed concentrically about a rotor. The electric drive axle 100 may additionally comprise an inverter (not depicted) for converting direct current to alternating current when the electric motor 104 is utilized to drive the vehicle, and for converting alternating current to direct current when the vehicle decelerates. The electric motor 104 may be referred to herein as a motor-generator. Further, the electric drive axle 100 may include cooling fluid (not depicted) such as, but not limited to, automatic transmission fluid or axle oil integrated with the electric drive axle 100 lubricant for cooling the electric motor 104 and the inverter. In another embodiment (not depicted), the cooling fluid for the electric motor 104 and the inverter may not be integrated with the axle oil. The electric drive may have either a co-axial or off axis layout where the axle shaft connecting the wheel to the differential does not pass through the center of the motor but rather parallel to the motor axis.

A motor output shaft 106 is coupled with the rotor of the electric motor 104 for rotation therewith. A first gear 108 is coupled with the motor output shaft 106. The electric motor 104 drives a compound idler assembly 110 via the motor output shaft 106 and the first gear 108. In an embodiment, as illustrated in FIGS. 2-3, the compound idler assembly 110 is disposed parallel with the motor output shaft 106.

As illustrated in FIGS. 2 and 3, the compound idler assembly 110 comprises a rotatable idler shaft 112 rotatably supported in an axle housing (not depicted) via first and second bearings 114A, 114B. It is understood that each of the bearings 114A, 114B can be any type of bearing as desired such as a roller bearing, a ball bearing, a tapered bearing, and the like, for example. A second or idler gear 120 is coupled for rotation with the idler shaft 112. The second gear 120 is disposed axially adjacent to the first bearing 114A. The second gear 120 is in meshed engagement with the first gear 108 and receives torque therefrom when the electric motor 104 is in operation. A pair of positioning elements 116A, 116B are respectively disposed on a first end 117 and an opposing second end 118 of the idler shaft 112 to maintain a position of the bearings 114A, 114B and the second gear 120. It is understood that each of the positioning elements 116A, 116B can be any type of positioning element as desired such as a snap ring, for example but could use a shim and press fit bearings if the application allows for it.

Figure 5:
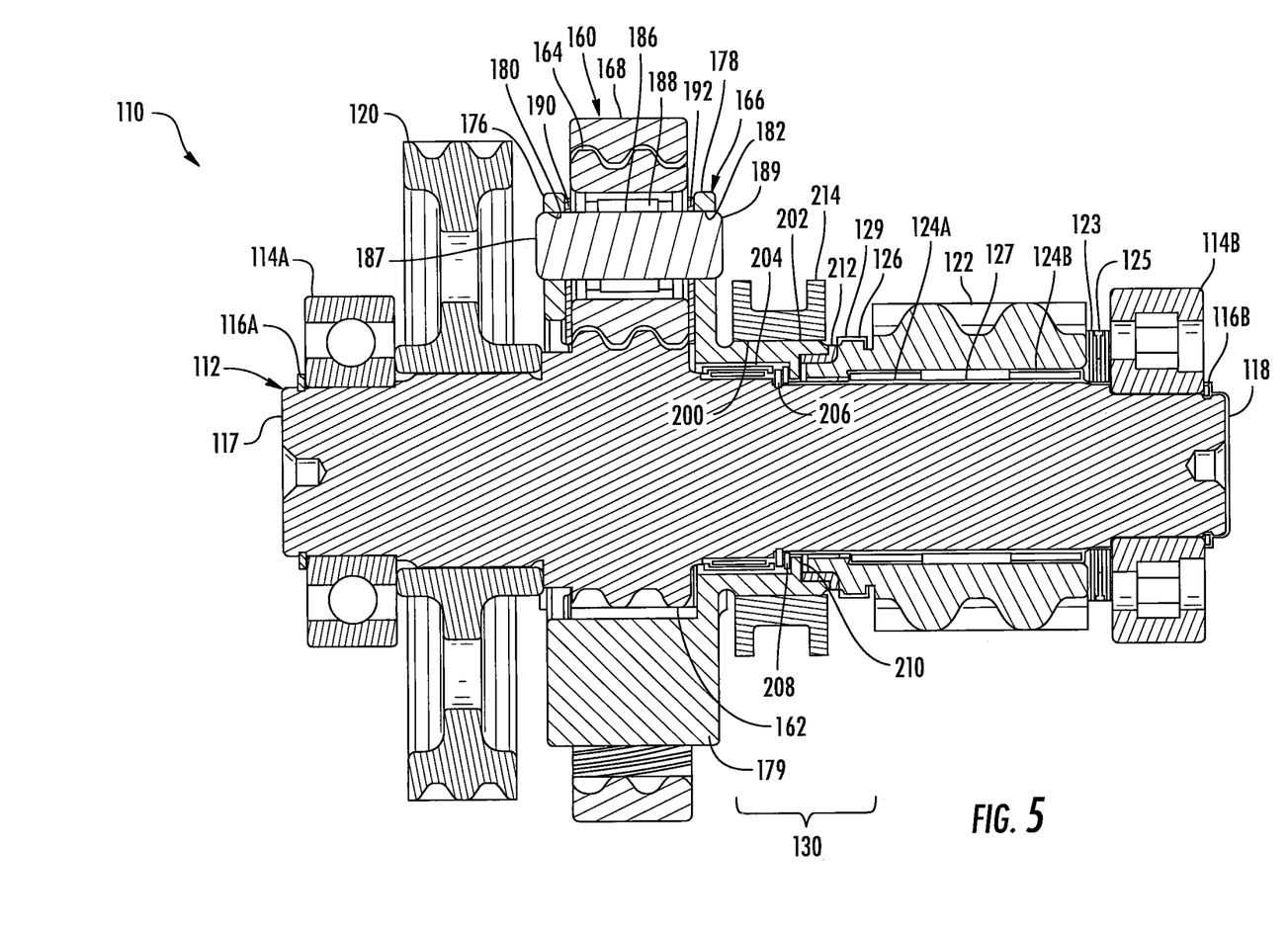
FIG. 5 is a cross-sectional view of the compound idler assembly shown in FIGS. 1-4.
Figure 6:
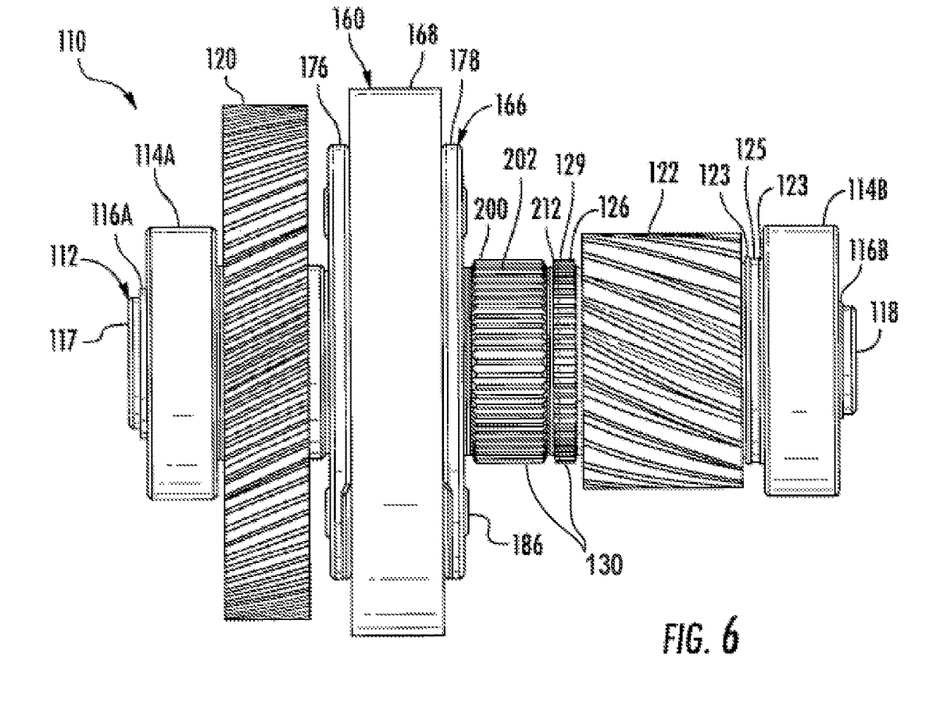
FIG. 6 is a side elevational view of the compound idler assembly shown in FIGS. 1-5, wherein a sleeve of a clutch assembly is removed.
Figure 7:
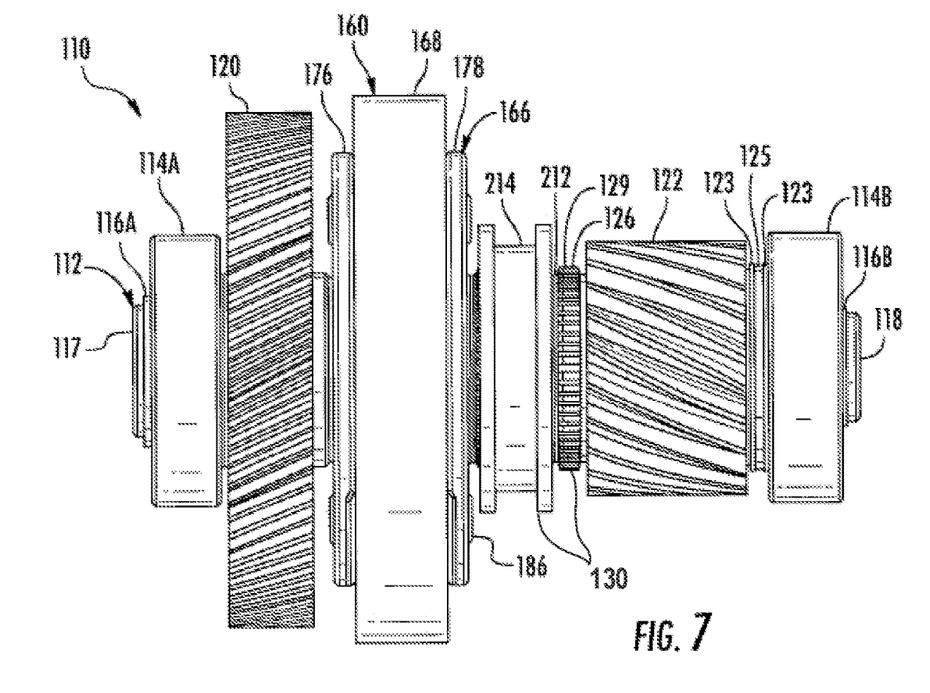
FIG. 7 is a side elevational view of the compound idler assembly shown in FIGS. 1-6, wherein the sleeve of the clutch assembly is in a first position.
Figure 8:
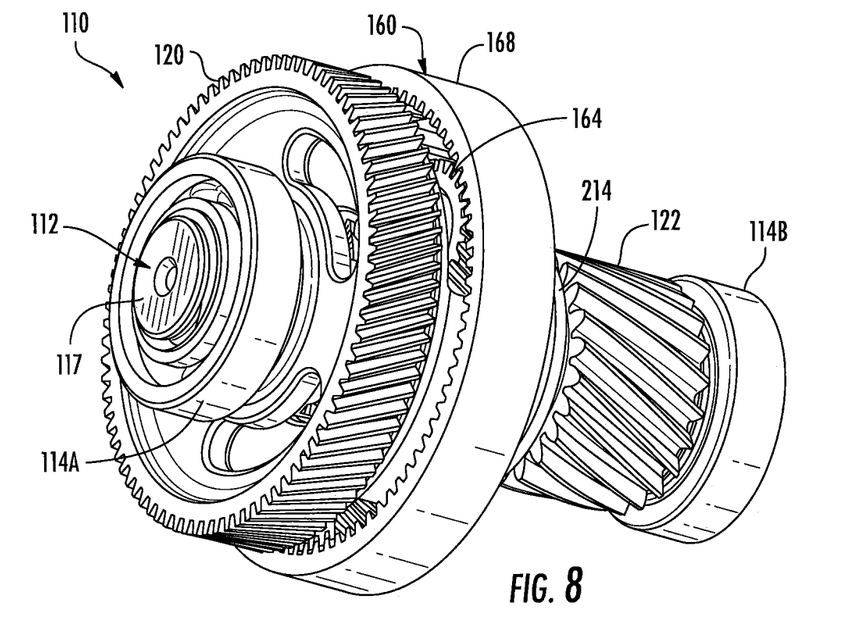
FIG. 8 is a front perspective view of the compound idler assembly shown in FIGS. 1-7.
Figure 9:
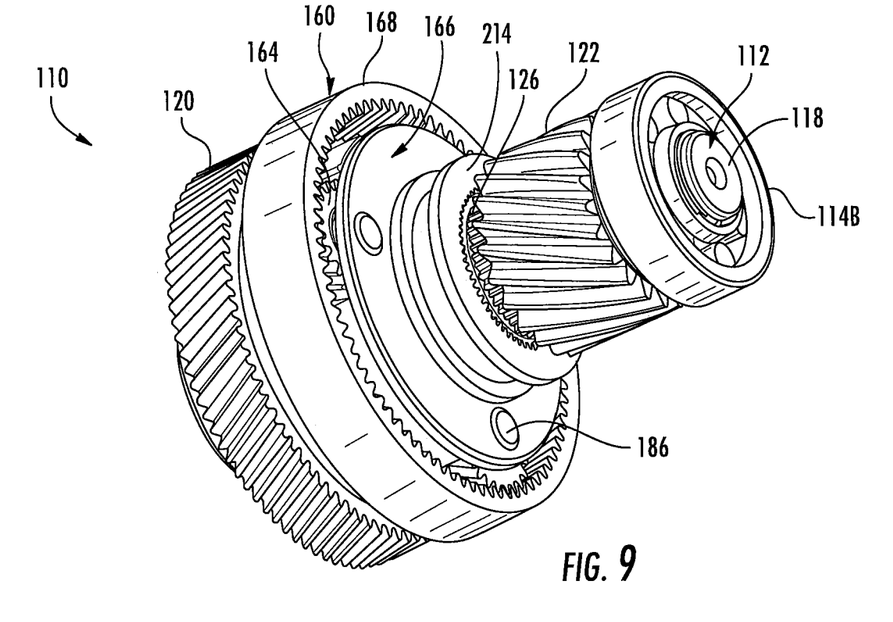
FIG. 9 is a rear perspective view of the compound idler assembly shown in FIGS. 1-8, wherein the sleeve of the clutch assembly is in the first position.

A third or output gear 122 is disposed concentrically about the idler shaft 112 adjacent the bearing 114B. As illustrated in FIG. 5, at least one thrust bearing 123 and at least one spacer 125 is interposed between the bearing 114B and the third gear 122. The third gear 122 may rotate relative to the idler shaft 112 via first and second needle bearings 124A, 124B, shown in FIG. 5, disposed radially therebetween. A spacer 127 may be interposed between the needle bearings 124A, 124B, if desired. The spacer 127 may be employed to militate against an axial movement of the needle bearings 124A, 124B along the idler shaft 112. In certain embodiments, the needle bearings 124A, 124B and the spacer 127 are removed and the third gear 122 may rotate relative to the idler shaft 112 via a lubrication system (not depicted) configured to supply a lubricant therebetween.

The third gear 122 comprises an axially extending annular hub 126 having a plurality of splines 129 or dog clutch teeth (not depicted) formed thereon and extending therefrom. The annular hub 126 is disposed concentrically about the idler shaft 112 adjacent the third gear 122. The annular hub 126 of the third gear 122 forms a portion of a clutch assembly 130. Although the annular hub 126 shown is integrally formed on the third gear 122, it is understood that it can be coupled to the third gear 122 as a separate and distinct component of the clutch assembly 130, if desired.

Figure 4:
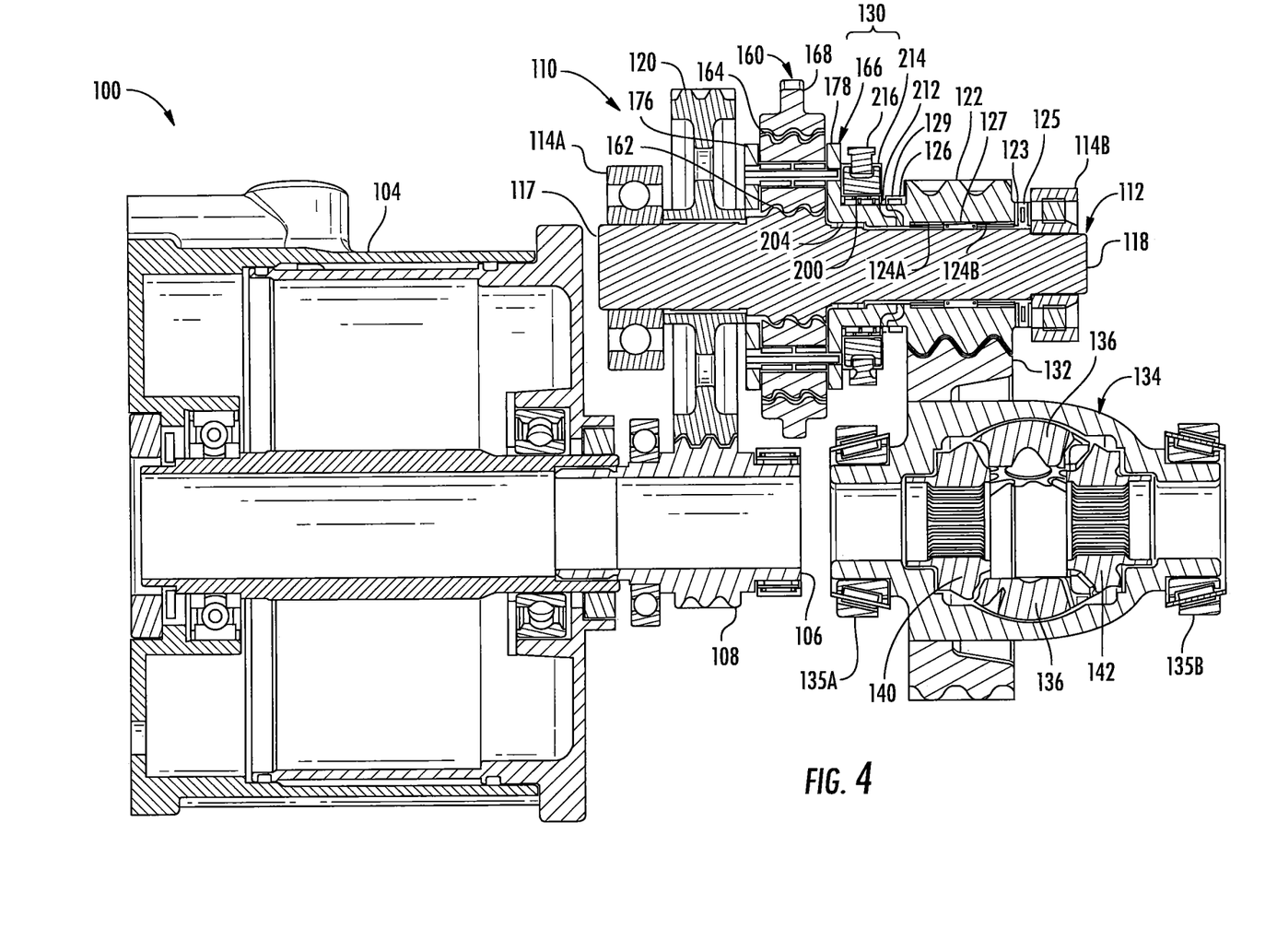
FIG. 4 is a cross-sectional view of the portion of the electric drive axle shown in FIG. 2 including the electric motor, the compound idler assembly, and the differential case, wherein an actuator of an operating device is shown.

In certain embodiments shown in FIGS. 2-4, the third gear 122 is in meshed engagement with a fourth gear 132. The fourth gear 132 is coupled for rotation with a differential case 134. The differential case 134 is rotatably supported within the axle housing (not depicted) via a pair of bearings 135A, 135B. It is understood that each of the bearings 135A, 135B can be any type of bearing as desired such as a roller bearing, a ball bearing, a tapered bearing, and the like, for example. As illustrated in FIG. 4, the differential case 134 houses two or more differential pinions 136. The differential pinions 136 are coupled with the differential case 134 via a pinion shaft (not depicted). In an embodiment, the pinion shaft may comprise a cross member. The differential pinions 136 are in meshed engagement with first and second side gears 140, 142. The first and second side gears 140, 142 are coupled for rotation with the first and second half shafts 16, 18, respectively, shown in FIG. 1.

Referring now to FIGS. 5-13, the compound idler assembly 110 further includes a planetary gear system 160. The planetary gear system 160 includes a sun gear 162, a plurality of planet gears 164 mounted in a carrier 166, and an annulus 168. The planetary gear system 160 is configured to produce a predetermined gear ratio between the second gear 120 and the third gear 122. In certain embodiments, the planetary gear system 160 is configured to produce a reduction in the gear ratio between the second gear 120 and the third gear 122. It is understood, however, that the reduction in the gear ratio between the second gear 120 and the third gear 122 depends upon which one of the sun gear 162, the planet gears 164, and the annulus 168 is operatively connected to the second gear 120 via the idler shaft 112, which one of the sun gear 162, the planet gears 164, and the annulus 168 is stationary, and which one of the sun gear 162, the planet gears 164, and the annulus 168 is operatively connected to the third gear 122.

In the embodiment shown in FIGS. 5-10, the sun gear 162 is operatively connected to the second gear 120 via the idler shaft 112, the planet gears 164 are operatively connected to the third gear 122 via the carrier 166 and the clutch assembly 130, and the annulus 168 stationary and fixedly mounted on a stationary structure (not depicted). For example, the annulus 168 may be fixedly mounted on the axle housing (not depicted), if desired. As illustrated, the sun gear 162 is integrally formed with the idler shaft 112. It is understood, however, that the sun gear 162 may be a separate and distinct component of the planetary gear system 160 and coupled to the idler shaft 112, if desired. In the embodiment shown, the planetary gear system 160 includes three equally circumferentially spaced planet gears 164 mounted in the carrier 166. It is understood, however, that the planetary gear system 160 can include any number and size of planet gears 164 as desired. One of ordinary skill in the art should further understand that the planet gears 164 may be mounted at various other positions in the carrier 166. As illustrated, each of the planet gears 164 is in meshed engagement with the sun gear 162 and the annulus 168. Various methods of meshed engagement between each of the planet gears 164, the sun gear 162, and the annulus 168 can be employed as desired.

In certain embodiments, the carrier 166 includes a first end plate 176, a second end plate 178 spaced apart from the first end plate 176, and a web 179, shown in FIG. 5, formed therebetween. As illustrated in FIG. 5, each of the end plates 176, 178 includes a plurality of apertures 180, 182, respectively, formed therein. The apertures 180 formed in the first end plate 176 are aligned with the apertures 182 formed in the second end plate 178. Additionally, the web 179 may be formed with recesses (not depicted) at angularly spaced locations aligned with the apertures 180, 182 to allow at least a portion of the planet gears 164 to protrude therefrom. In the embodiment shown, the end plates 176, 178 each include three equally circumferentially spaced apertures 180, 182, respectively, formed therein. It is understood, however, that the end plates 176, 178 can include any number and size of apertures 180, 182 and the web 179 can include any number and size of recesses, as desired. One of ordinary skill in the art should further understand that the apertures 180, 182 may be formed at various other positions in the respective end plates 176, 178, and the recesses (not depicted) may be formed at various other positions in the web 179.

The planetary gear system 160 shown further includes a plurality of pinion shafts 186. Each of the pinion shafts 186 is disposed axially through one of the planet gears 164 and supported at respective ends 187, 189 thereof by a pair of the apertures 180, 182 formed in the respective end plates 176, 178 of the carrier 166. The pinion shafts 186 may be coupled to the carrier 166 by any device or method as desired such as being press fit into the apertures 180, 182 or secured by a pin, for example. A needle bearing 188, shown in FIG. 5, is radially disposed on an outer periphery of each of the pinion shafts 186. Each of the planet gears 164 is rotatably supported on the outer periphery of each of the pinion shafts 186 by the needle bearing 188. In certain embodiments, each of the pinion shafts 186 has a generally cylindrical shape. It is understood, however, that the pinion shafts 186 can have other shapes and sizes as desired.

In certain embodiments, the planetary gear system 160 further includes a first thrust plate 190 and a second thrust plate 192. The thrust plates 190, 192 are configured to minimize friction and excessive wear between the planet gears 164 and the carrier 166. In various embodiments, each of the thrust plates 190, 192 is a generally circular-shaped disc having an axial cylindrical bore formed therethrough. It is understood that each of the thrust plates 190, 192 can have various shapes and sizes as desired. As illustrated in FIG. 5, the first thrust plate 190 is disposed about each of the pinion shafts 186 and interposed between the first end plate 176 of the carrier 166 and at least one of the planet gears 164. Similarly, the second thrust plate 192 is disposed about each of the pinion shafts 186 and interposed between the second end plate 178 of the carrier 166 and at least one of the planet gears 164. As shown, each of the planet gears 164, the carrier 166, and the thrust plates 190, 192 may have at least one substantially planar face. It is understood, however, that each of the planet gears 164, the carrier 166, and the thrust plates 190, 192 may have at least one face including various patterns and configurations of channels formed therein and protuberances formed thereon to facilitate friction control between the planet gears 164 and the carrier 166, as well as receive a lubricant therein.

As more clearly shown in FIG. 5, the carrier 166 further includes an annular hub 200 extending axially outwardly from an outer surface of the second end plate 178. The annular hub 200 includes a plurality of splines 202 or dog clutch teeth (not depicted) formed thereon and extending therefrom. The annular hub 200 of the carrier 166 forms a portion of the clutch assembly 130. Although the annular hub 200 shown is integrally formed on the carrier 166, it is understood that it can be coupled to the second end plate 178 as a separate and distinct component of the clutch assembly 130, if desired. The annular hub 200 is disposed concentrically about the idler shaft 112 and may rotate relative thereto via a needle bearing 204, shown in FIG. 5, disposed radially therebetween. A spacer 206 and at least one positioning element 208 may be interposed between the needle bearing 204 and an radially inwardly extending flange 210 formed on an inner peripheral surface of the annular hub 200 to militate against an axial movement of the needle bearing 204 along the idler shaft 112. It is understood that the positioning element 208 can be any type of positioning element as desired such as a snap ring, for example. A bushing 212 may be disposed concentrically about the idler shaft 112 and interposed between the annular hub 126 of the third gear 122 and the annular hub 200 of the carrier 166. The bushing 212 is configured to militate against friction between the annular hubs 126, 200.

In other embodiments, a thrust bearing (not depicted) may be disposed concentrically about the idler shaft 112 and interposed between the first end plate 176 of the carrier 166 and the second gear 120 to militate against friction therebetween. Various types of bearings can be employed for the thrust bearing as desired.

Figure 10:
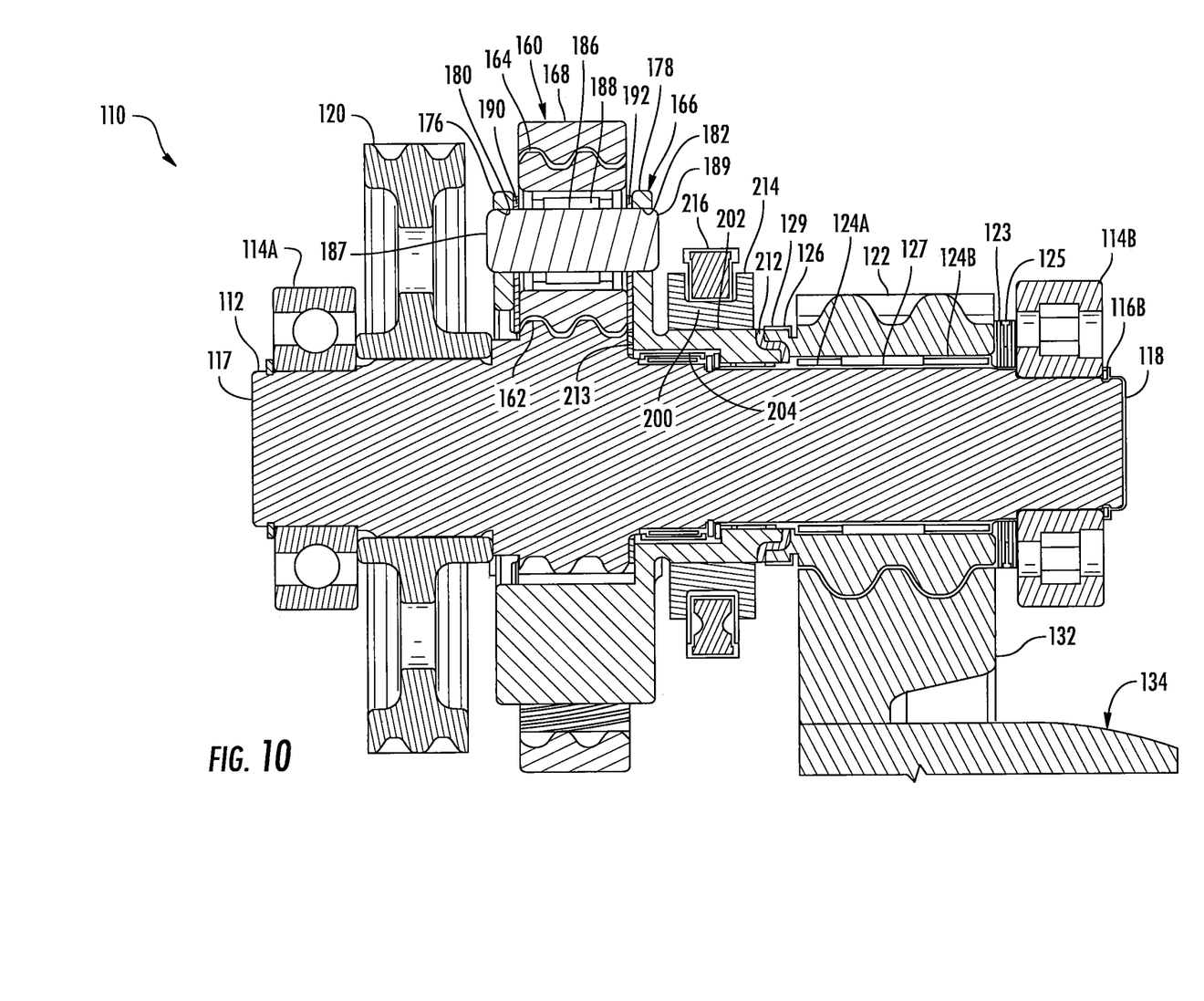
FIG. 10 is a cross-sectional view of a compound idler assembly according to another embodiment.

In yet other embodiments shown in FIG. 10, a thrust bearing 213 may be disposed concentrically about the idler shaft 112 and interposed between the carrier 166 and the sun gear 162 to militate against friction therebetween. Various types of bearings can be employed for the bearing 213 as desired.

It should be appreciated that additional bearings may be employed between various components of the electric drive axle 100 to militate against friction therebetween.

As illustrated, the clutch assembly 130 further includes a sleeve 214. The sleeve 214 shown is concentrically disposed about the annular hub 200 when the clutch assembly 130 is in a first or disengaged position, shown in FIGS. 2-5. It is understood, however, that the sleeve 214 may be concentrically disposed about the annular hub 126 of the third gear 122 when the clutch assembly 130 is in the disengaged position, if desired. In an embodiment, an inner peripheral surface of the sleeve 214 includes a plurality of splines 216 formed thereon. The splines 214 are of such shape, size, and number so as to cooperate with the splines 129, 202 of the annular hubs 126, 200, respectively. In certain embodiments, the sleeve 214 has an axial length sufficient to enable a meshed engagement with both the annular hubs 126, 200 when the clutch assembly 130 is in a second or engaged position (not depicted).

The sleeve 214 is coupled to the annular hubs 126, 200 to permit a linear actuation thereof to cause the clutch assembly 130 to be actuated from the first or disengaged position to the second or engaged position. In certain embodiments, the linear actuation of the sleeve 214 is caused by a controller (not depicted) in electrical communication with an operating device (not depicted). The operating device (not depicted) may be any operating device as desired such as a high-speed low-torque brushless direct current motor, for example. The operating device (not depicted) may include an actuator 216 coupled therewith. The actuator 216 may be operatively connected with the sleeve 214 to move the sleeve 214 from a first position when the clutch assembly 130 is in the disengaged position to a second position when the clutch assembly 130 is in the engaged position. It is understood that the linear actuation of the sleeve 214 from the first position to the second position thereof may be caused by other methods as desired.

Figure 11:
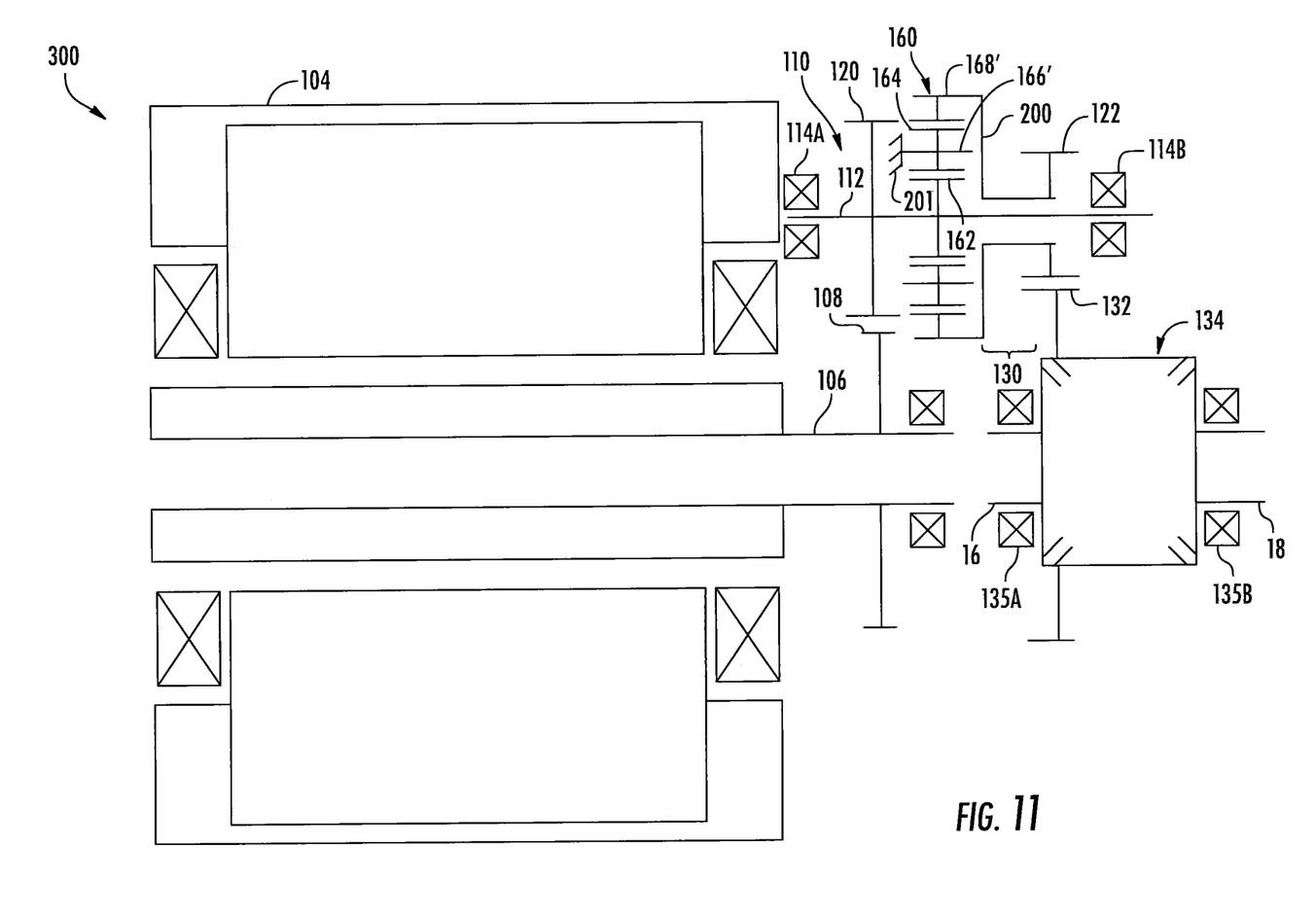
FIG. 11 is a schematic diagram of the portion of the electric drive axle shown in FIG. 1 including a compound idler assembly according to another embodiment.

FIG. 11 illustrates an electric drive axle 300 according to another embodiment of the present invention similar to the electric drive axle 100 of FIGS. 1-10, except as described below. Structure repeated from the description of FIGS. 1-10 includes the same reference numeral. Variations of structure shown in FIGS. 1-10 include the same reference numeral and a prime (') symbol.

In the embodiment shown in FIG. 11, the sun gear 162 is operatively connected to the second gear 120 via the idler shaft 112 for rotation with the idler shaft 112, a carrier 166' is stationary, and the annulus 168' is operatively connected to the third gear 122 via the clutch assembly 130. It is understood that the carrier 166' may be fixedly mounted to a stationary structure 201 such as the axle housing, for example. As illustrated, the annular hub 200 is formed to extend axially outwardly from an outer surface of the annulus 168' instead of the carrier 166'. The annular hub 200 can be integrally formed on the annulus 168' or coupled thereto as a separate and distinct component of the clutch assembly 130, if desired.

Figure 12:
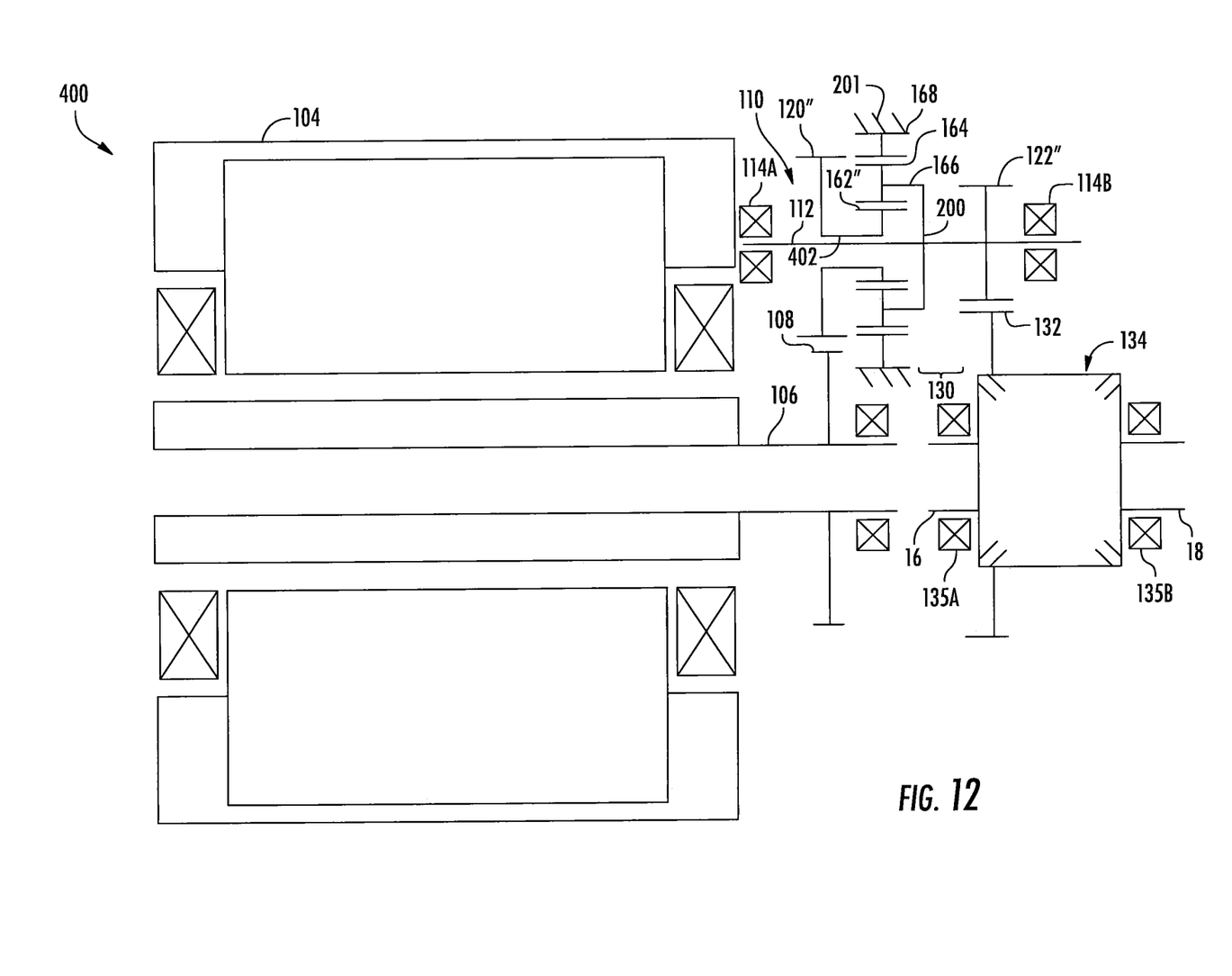
FIG. 12 is a schematic diagram of the portion of the electric drive axle shown in FIG. 1 including a compound idler assembly according to another embodiment.

FIG. 12 illustrates an electric drive axle 400 according to another embodiment of the present invention similar to the electric drive axle 100 of FIGS. 1-10, except as described below. Structure repeated from the description of FIGS. 1-10 includes the same reference numeral. Variations of structure shown in FIGS. 1-10 include the same reference numeral and a double prime (") symbol.

In the embodiment shown in FIG. 12, a sun gear 162" is operatively connected to a second gear 120" via a connecting portion 402 formed therebetween, the planet gears 164 are operatively connected to a third gear 122" via the carrier 166 and the clutch assembly 130, and the annulus 168 is stationary and fixedly mounted on a stationary structure 201. For example, the annulus 168 may be fixedly mounted on the axle housing (not depicted), if desired. The second gear 120" and the sun gear 162" rotate relative to the idler shaft 112 via at least one needle bearing (not depicted) disposed radially between each of the gears 120",162" and the idler shaft 112. A spacer (not depicted) also may be interposed between the needle bearings, if desired. The spacer may be employed to militate against an axial movement of the needle bearings along the idler shaft 112. In certain other embodiments, the second gear 120" and the sun gear 162" rotate relative to the idler shaft 112 via a lubrication system (not depicted) configured to supply a lubricant therebetween. Further, the third gear 122", shown in FIG. 12, is integrally formed with the idler shaft 112 for rotation therewith. It is understood, however, that the third gear 122" may be a separate and distinct component coupled to the idler shaft 112 for rotation therewith, if desired.

Figure 13:
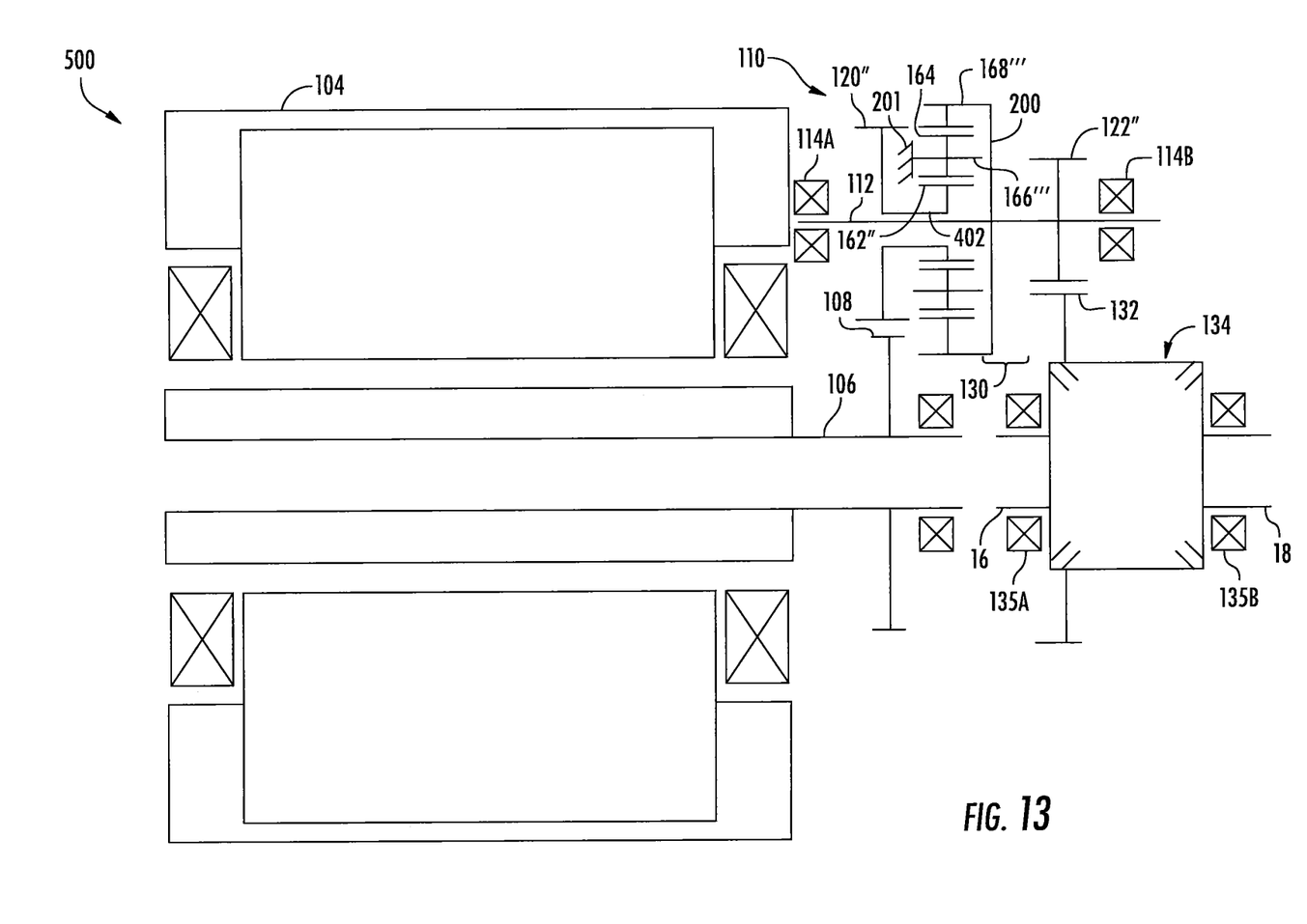
FIG. 13 is a schematic diagram of the portion of the electric drive axle shown in FIG. 1 including a compound idler assembly accordingly to yet another embodiment.

FIG. 13 illustrates an electric drive axle 500 according to yet another embodiment of the present invention similar to the electric drive axles 100, 300, 400 of FIGS. 1-12, except as described below. Structure repeated from the description of FIGS. 1-12 includes the same reference numeral. Variations of structure shown in FIGS. 1-12 include the same reference numeral and a triple prime ('") symbol.

In the embodiment shown in FIG. 13, the sun gear 162" is operatively connected to the second gear 120" via the connecting portion 402, the carrier 166'" is stationary, and the annulus 168'" is operatively connected to the third gear 122" via the clutch assembly 130. It is understood that the carrier 166" may be fixedly mounted to a stationary structure 201 such as the axle housing, for example. The second gear 120" and the sun gear 162" rotate relative to the idler shaft 112 via at least one needle bearing (not depicted) disposed radially between each of the gears 120",162" and the idler shaft 112. A spacer (not depicted) also may be interposed between the needle bearings, if desired. The spacer may be employed to militate against an axial movement of the needle bearings along the idler shaft 112. In certain other embodiments, the second gear 120" and the sun gear 162" rotate relative to the idler shaft 112 via the lubrication system (not depicted) configured to supply the lubricant therebetween. Further, the third gear 122", shown in FIG. 13, is integrally formed with the idler shaft 112 for rotation therewith. It is understood, however, that the third gear 122" may be a separate and distinct component coupled to the idler shaft 112 for rotation therewith, if desired. As illustrated, the annular hub 200 is formed to extend axially outwardly from an outer surface of the annulus 168''' instead of the carrier 166'''. The annular hub 200 can be integrally formed on the annulus 168''' or coupled thereto as a separate and distinct component of the annulus 168''', if desired.

In operation, the electric motor 104 outputs a first torque to the idler shaft 112 via the meshed engagement of the first and second gears 108, 120, 120',120". A default state of the clutch assembly 130 is the disengaged position. As such, the sleeve 214 is in the first position and concentrically disposed about one of the annular hubs 126, 200. Hence, the vehicle 10 is driven solely by the internal combustion engine 12.

When the operator desires the vehicle 10 to be at least partially driven by one of the electric drive axles 100, 300, 400, 500 the controller (not depicted) transmits a signal to the operating device (not depicted) to linearly move the sleeve 214 from the first position to the second position thereof. When the sleeve 214 is in the second position, the sleeve 214 is in a meshed engagement with both the annular hubs 126, 200 and the clutch assembly 130 is in the engaged position. When the clutch assembly 130 is in the engaged position, the idler shaft 112 transfers the first torque from the electric motor 104 to the third gear 122, 122',122" via the planetary gear system 160 and the clutch assembly 130 to produce a predetermined second torque. Thereafter, the third gear 122, 122',122" transfers the predetermined second torque to the differential case 134 via the meshed engagement of the third gear 122, 122',122" and the fourth gear 132. The differential case 134 then transfers a desired third torque to the first and second axle shafts 16, 18 via the differential mechanism. When the electric drive axle 100, 300, 400, 500 is in a power generation mode, the torque transfer described above is reversed.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. An electric drive axle, comprising:
   a first gear;
   a rotatable shaft having a second gear and a third gear disposed thereabout, wherein the second gear cooperates with the first gear;
   a planetary gear system disposed about the rotatable shaft and comprising at least one annular hub, wherein the planetary gear system is configured to produce a predetermined gear ratio between the second gear and the third gear;
   an annular hub formed on the third gear; and
   a sleeve configured to selectively engage one or more of the at least one of annular hub of the planetary gear system and the annular hub of the third gear.

2. The electric drive axle of claim 1, wherein the planetary gear system includes at least one sun gear, a plurality of planet gears disposed in a carrier, and at least one annulus.

3. The electric drive axle of claim 2, wherein at least one of the second gear, the at least one sun gear, the carrier, the at least one annulus, and the third gear is coupled to the rotatable shaft for rotation therewith.

4. The electric drive axle of claim 2, wherein at least one of the second gear, the at least one sun gear, the carrier, the at least one annulus, and the third gear freely rotates about the rotatable shaft.

5. The electric drive axle of claim 2, wherein at least one of the at least one sun gear, the carrier, and the at least one annulus is stationary.

6. The electric drive axle of claim 2, further comprising a clutch assembly disposed about the rotatable shaft.

7. The electric drive axle of claim 6, wherein the clutch assembly is disposed between the planetary gear system and one of the second gear and the third gear.

8. The electric drive axle of claim 6, wherein at least one of the second gear, the at least one sun gear, the carrier, the at least one annulus, and the third gear is selectively coupled to the rotatable shaft by the clutch assembly.

9. The electric drive axle of claim 2, wherein the annular hub of the planetary gear system is formed on one of the at least one sun gear, the carrier, and the at least one annulus.

10. An electric drive axle, comprising:
    a first gear;
    a rotatable shaft having a second gear and a third gear disposed thereabout, wherein the second gear cooperates with the first gear;
    a planetary gear system disposed about the rotatable shaft and comprising at least one sun gear, a plurality of planet gears disposed in a carrier, and at least one annulus, wherein the planetary gear system is configured to produce a predetermined gear ratio between the second gear and the third gear;
    a clutch assembly disposed about the rotatable shaft and comprising:
       an annular hub formed on one of the at least one sun gear, the carrier, and the at least one annulus of the planetary gear system,
       an annular hub formed on the third gear, and
       a sleeve configured to selectively engage at least one of the annular hub of the planetary gear system and the annular hub of the third gear.

11. The electric drive axle of claim 1, further comprising a differential mechanism configured to transfer a desired toque to at least one axle shaft.

12. The electric drive axle of claim 11, further comprising a fourth gear coupled for rotation with the differential mechanism, wherein the fourth gear cooperates with the third gear.

13. A method of generating torque for a vehicle, comprising:
    providing an electric drive axle comprising:
       a first gear,
       a rotatable shaft having a second gear and a third gear disposed thereabout, wherein the second gear cooperates with the first gear,
       a planetary gear system disposed about the rotatable shaft and comprising an annular hub,
       an annular hub formed on the third gear, and a sleeve configured to selectively engage the annular hub of the planetary gear system and the annular hub of the third gear; and producing a desired torque by selectively coupling the planetary gear system to one of the first gear and the third gear.

14. The method of claim 13, wherein the planetary gear system produces a predetermined gear ratio between the second gear and the third gear.

15. The method of claim 13, wherein the planetary gear system comprises at least one sun gear, a plurality of planet gears disposed in a carrier, and at least one annulus.

16. The method of claim 13, wherein the annular hub of the planetary gear system is formed on one of: at least one sun gear, a carrier, and at least one annulus.

* * * * *